July 26, 1955 L. D. BARRY 2,714,133

MAGNETIC SHIELDING MEDIUM

Filed June 18, 1952

INVENTOR.

Leonard Dodge Barry

United States Patent Office 2,714,133

Patented July 26, 1955

2,714,133

MAGNETIC SHIELDING MEDIUM

Leonard Dodge Barry, Detroit, Mich.

Application June 18, 1952, Serial No. 294,279

4 Claims. (Cl. 179—100.2)

This invention relates to a method and means for shielding magnetic recordings to prevent magnetic printing of recorded signals on adjacent layers of medium when stored and to influence the flux lines of recorded signals to provide desirable effects.

Loud sounds recorded on tape will print a noticeable echo in quiet sections of adjacent layers of tape when stored on a reel. Similarly magnetic disk recordings will contact print strong signals into areas of weak signal on adjacent disks stacked in contact. Under favorable conditions of storage and by limitation of the signal intensity and using a tape which has low printing effect such as a coated tape, magnetic printing can be kept down to 55 or more db below peak signal level. Temperatures above 75° F. and stray magnetic fields, even though extremely weak, will greatly increase this magnetic printing effect.

When video signals are recorded on the tape, see my patent application on Tape Recorder, Serial No. 292,013, and filing date of May 27, 1952, the effects of magnetic printing will be noticeable and objectionable. Weak sounds are drowned out by loud ones as heard by the ear, so that only on replay of relatively quiet portions stored in magnetic proximity to loud signals is the effect of magnetic printing heard. In a video recording on the other hand a printed echo or ghost picture as it might be called though weak will be seen, and the picture reproduced will be almost continuously altered thereby and disrupted by annoying changes in the printed echo.

It is therefore an object of this invention to provide a means to prevent or substantially limit magnetic printing in stored media.

Another object is to enable broader application of recording tapes and media now limited in application because of inherent tendencies to print.

Another object is to reduce random noise of extremely low frequency recording by providing a return magnetic path having high permeability thereby helping to prevent the dividing of a long thin magnet into two or more magnets or random local magnetization. Also the noise level with D. C. bias should therefore decrease.

Another object is to provide a means to limit crosstalk between parallel tracks of recording and thereby enable closer spacing of these tracks for a given limitation of maximum crosstalk.

Another object is to slightly reduce the flux picked up by magnetic heads from the long magnets and to reduce the flux less, or not at all, the shorter the magnets, thereby de-emphasizing the low and intermediate frequencies, thus providing some pre-emphasis.

Other objects and advantages of this invention should become apparent from the following disclosure and study of this invention.

This invention is a record shielding medium consisting preferably of a magnetic material of high permeability and low coercivity associated with a magnetic recording means so as to provide a return magnetic path for the recorded signals whereby the flux lines are substantially limited from reaching adjacent layers of recording and whereby the signal recorded is not objectionably closed on itself through the material of high permeability and low coercivity when under the reproducing heads. Any material which increases the space between layers of stored magnetic recording media can serve to reduce magnetic printing, but to effectively shield recorded magnetic media with a minimum increase in space requires a material of high permeability and low coercivity. A material of low coercivity readily gives up a proportionate amount of flux linking through it from a recorded medium when a magnetic head is encountered providing a path of low reluctance for the recorded flux, and a material having low coercivity is readily remagnetized after the head is passed.

Some embodiments of this invention and the theory therefore are illustrated in the accompanying drawing in which.

Figures 3, 4:
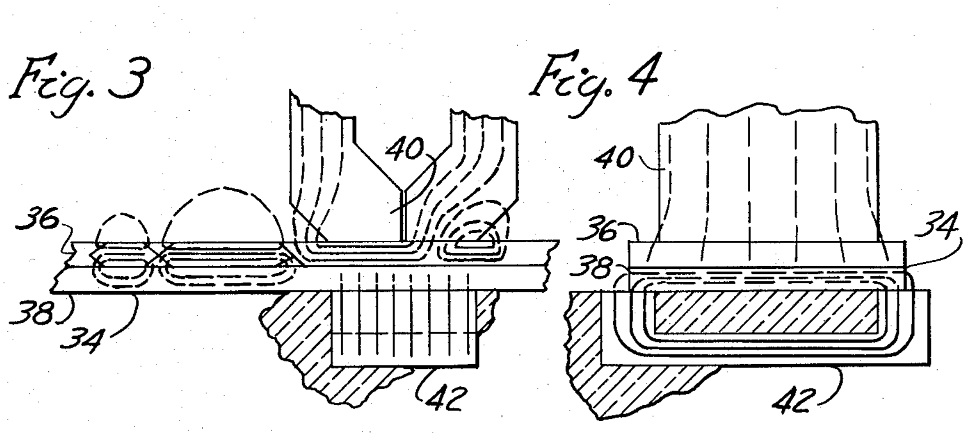

Figure 3 is an edge view of a portion of tape composed of a dispersed powder recording medium and a dispersed powder shielding medium unified to form one tape. A magnetic reproducing head is shown contacting the recording layer. A permanent magnet crosswise the tape is shown whereby flux lines, also illustrated, are driven out of their normal return path through the shielding layer to make the magnetic head their return path.

Figure 4 is an end view of the tape, magnet, and head shown in Figure 3.

Figure 5:
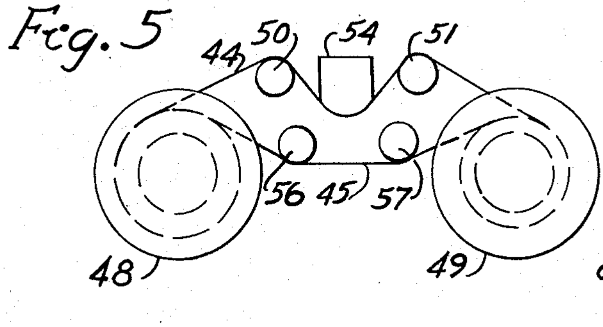

Figure 5 is a schematic plan view of an arrangement for routing a separate shielding tape away from the magnetic heads on a magnetic recorder.

Figure 1:
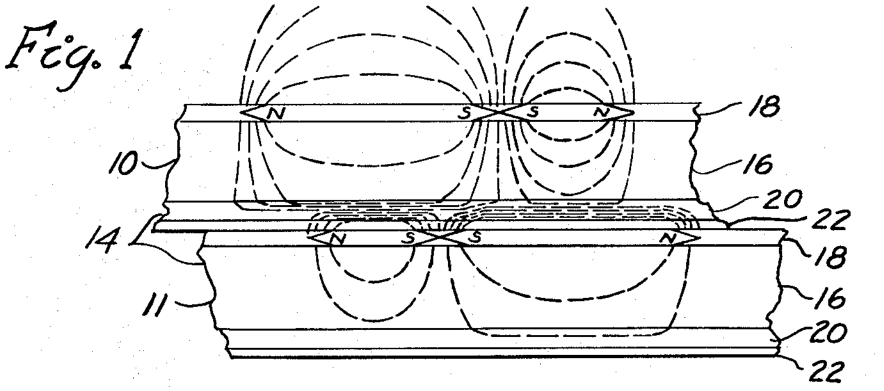
Figure 1 is an edge view of two adjacent layers of tape having this invention applied thereto and shown in magnetic proximity as found on a reel. Flux lines are shown to illustrate shielding.

Referring to the drawing and in particular to Figure 1; adjacent layers 10 and 11 of magnetic tape 14 are shown as they would be in contact as on a reel, layer 10 being exposed and layer 11 being underneath. Tape 14 has the usual plastic or paper base portion 16. A typical recording coating 18 of magnetic material such as red magnetic oxide of iron mixed with a suitable binder material such as a synthetic resin or mixture thereof is applied to one side of the base 16, this being present practice in making recording tapes. A magnetic coating 20 of high permeability and low coercive force of material such as permalloy, mumetal, supermalloy, or other "soft" magnetic material properly heat treated, powdered, and mixed with a binder similar to the binder used for the recording coating is applied to the opposite side of the base 16. The shielding material need not be as fine a powder as the recording material, since the shielding material does not come in contact with the magnetic heads. The shielding material is covered by a thin layer of plastic 22 such as cellulose acetate to reduce wear and prevent scratching of the recording coating by the shielding material. Layer 22 can be omitted if desired. The tape is similar to present day tapes except for the shielding coating and its covering.

The signal recorded is illustrated by bar magnets and flux lines. The flux lines on the layer 10 take their normal return path mainly through space and non-magnetic base material 16. The flux lines on the layer of tape 11 underneath take their return path mainly through the low reluctance shielding layer of the above tape layer when the tape is wound on a reel. By thus short circuiting the magnetic flux during storage the flux lines through the base material are reduced to a minimum as seen in layer 11. The flux lines of the recorded signals being closed through the shielding layer do not enter the recorded coating of the adjacent layers of tape, and magnetic printing is thereby prevented.

Figure 2:
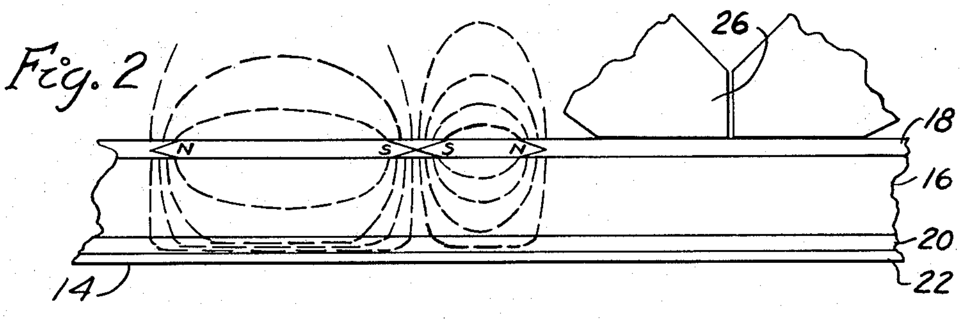
Figure 2 is an edge view of the magnetically shielded tape shown in Figure 1 with flux lines shown to illustrate reduction of the external field of a long recorded magnet and a short magnet relatively unaffected. The long magnet is shown utilizing the magnetic shield for a return path, which helps prevent demagnetization, random magnetization, crosstalk, and provides some pre-emphasis.

Referring to Figure 2, a recorded signal is shown on tape 14 as it approaches the pickup head 26. The signal is composed of a long and a short magnet with flux lines shown. The portion of the flux linking from the recorded magnet to the shielding material is approximately proportional to the length of the magnet, since the longer the magnets are the more they utilize the shielding layer for a return path. The long magnets have flux lines expanding farther out in space than the short magnets, therefore more flux from the long magnets reaches the shield, magnetizing this, and maintaining the flux density of the long magnets at a higher level than otherwise, which impedes the formation of random poles along the face of the magnet. It is a well known fact that permanent magnets should be stored in pairs opposite poles in contact to reduce the demagnetizing effect.

D. C. erase leaves an extremely long saturated magnet the flux lines of which must close external to the magnet. The flux of such a magnet would return through the shielding medium, and a magnetic head moving along this magnet would not encounter flux lines entering or leaving the medium as it otherwise would, since practically all flux leaves or enters the magnet on the side thereof facing the shielding material except at the ends.

Crosstalk between parallel recorded tracks is limited, because the longer the magnets the more they close their flux lines through the shielding medium. Crosstalk without magnetic shielding is a function of the wave length recorded.

By the proper selection of thickness of coatings and base material the response of the long magnets can be reduced similarly to the reduction of the flux of the long magnets provided in pre-emphasis by reducing the current in the recording head during low frequency. Thus the low frequency portion of pre-emphasis can be provided without reducing the recording current.

Referring to Figures 3 and 4, tape 34 is composed of a layer 36 consisting of a vehicle of sufficient strength and a magnetic recording powder dispersed therethrough and a shielding layer 38 consisting of a similar vehicle and a magnetic powder of low coercivity and high permeability dispersed therethrough. A tape such as would be provided by layer 36 alone would exhibit magnetic printing to an objectionable extent. Layer 38 prevents magnetic printing as described with Figures 1 and 2, but it also closes the recorded flux lines with practically no external field with respect to the tape. In order that the signal can be picked up by magnetic head 40, a permanent magnet 42 is located with opposite poles contacting opposite edges of the tape along the shielded underside thereof underneath head 40. The flux from magnet 42 saturates the shielding layer 38 causing the flux from the recorded portion to take the path of low reluctance through head 40 thereat provided. Using an electromagnet in place of magnet 42, control of the current through the coil thereof provides a means for controlling the output volume. The maximum flux from magnet 42 is limited to a maximum value which nearly saturates the shielding medium. The shielding layer should have high permeability under extremely low magnetizing forces. Permalloy containing 78.5 per cent nickel and 21.5 per cent iron when properly heat treated has these desirable characteristics.

Referring to Figure 5, a recording tape 44 and a shielding tape 45 are reeled together on supply reel 48 and take-up reel 49. Different paths are established therefore between reels. Tape 44 is guided on rollers 50 and 51 to contact head 54, and tape 45 is guided by rollers 56 and 57 to avoid head 54 whereby the flux lines on the recorded medium 44 are unaltered by the shielding medium in the vicinity of head 54.

Shielding tape 45 is a thin flexible medium. Material thereof could be any high-permeable low-coercive material in strip form, or plated on a suitable base, or powdered and coated on or dispersed in a suitable medium similarly as in the making of recording tapes.

Any high-permeable low-coercive material may serve as shielding material. Nickel-iron alloy in the form of a shielding tape for example can be plated with a recording layer and vice versa. Nonmagnetic materials such as brass or Phosphor-bronze can be plated on one side with a recording layer and on the opposite side with a shielding layer.

Figures 1 through 4 with the construction and theory therefore equally apply to the shielding of magnetic disks. The word tape as herein used is defined as inclusive of film.

Although I have shown and described a few methods and means for providing and utilizing magnetic shielding between recorded magnetic layers, it is understood that various changes and modifications may be made therein within the scope of the appended claims without departing from the spirit and scope of my invention.

I claim:

1. On a magnetic recorder, a magnetic medium which comprises, a magnetic recording layer and a magnetic shielding layer on one side of said recording layer, said shielding layer having low coercivity and high permeability under low magnetizing forces; a magnet located against said shielding layer and arranged to magnetize said shielding layer transversely; a magnetic playback head located against said recording layer opposite said magnet, whereby said magnet magnetizes said shielding layer rerouting to said head longitudinal flux closed through said shielding layer from a recording on said recording layer when under said head.

2. On a magnetic tape recorder, a magnet as claimed in claim 1, said magnet being an electromagnet, means to adjust the current therethrough, said means being set to provide a low enough magnetic intensity whereby said shielding layer substantially prevents flux from said magnet reaching said recording layer and high enough to sufficiently saturate said shielding layer to reroute flux from said recording layer to said head.

3. On a magnetic tape recorder, a magnetic playback head, a U-shaped magnet having pole faces located in substantially the same plane and opposite said head, whereby a magnetic recording tape can pass between said head and said magnet with a recording layer thereon contacting said head and a shielding layer thereon contacting said magnet, said magnet being arranged to transversely magnetize the shielding layer with respect to the direction of intended movement of the tape.

4. In combination; a magnetic medium comprising, an exposed layer of magnetic recording material, a layer of magnetic material of high permeability and low coercivity, means securing wide faces of said layers together leaving the outer wide faces exposed; a magnetic head, and a magnet having pole faces lying on the same plane spaced opposite the poles of said head whereby said magnetic medium can be passed between said head and said magnet with said layer of magnetic recording material in contact with said head and said layer of magnetic material of high permeability and low coercivity in contact with said magnet; whereby transverse flux from said magnet reduces the incremental permeability of said magnetic material as the recording material passes the recording head.

References Cited in the file of this patent

UNITED STATES PATENTS

| | | |
|---|---|---|
| 1,846,110 | Hornauer | Feb. 23, 1932 |
| 1,949,840 | Languenpen | Mar. 6, 1934 |
| 2,185,300 | Hickman | Jan. 2, 1940 |
| 2,496,047 | Goddard | Jan. 31, 1950 |
| 2,647,954 | Howell | Aug. 4, 1953 |